United States Patent
Lin et al.

(10) Patent No.: US 12,080,086 B2
(45) Date of Patent: Sep. 3, 2024

(54) SPARSE-AWARE CONVOLUTION AND TECHNIQUES FOR ACCELERATION THEREOF

(71) Applicant: QUALCOMM Incorporated, San Diego, CA (US)

(72) Inventors: Jamie Menjay Lin, San Diego, CA (US); Shizhong Steve Han, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/407,046

(22) Filed: Aug. 19, 2021

(65) Prior Publication Data

US 2022/0058450 A1 Feb. 24, 2022

Related U.S. Application Data

(60) Provisional application No. 63/068,891, filed on Aug. 21, 2020.

(51) Int. Cl.
*G06V 30/192* (2022.01)
*G06F 16/25* (2019.01)
*G06T 7/45* (2017.01)

(52) U.S. Cl.
CPC .......... *G06V 30/195* (2022.01); *G06F 16/258* (2019.01); *G06T 7/45* (2017.01); *G06T 2207/30208* (2013.01)

(58) Field of Classification Search
CPC ...... G06F 16/258; G06F 17/153; G06F 3/014; G06F 3/016; G06F 3/017; G06F 3/0233; G06F 3/0426; G06F 3/04886; G06N 3/045; G06N 3/08; G06T 2207/30208; G06T 7/45; G06V 30/195; G16B 30/00
See application file for complete search history.

(56) References Cited

U.S. PATENT DOCUMENTS

| 9,104,271 | B1* | 8/2015 | Adams | G06F 3/0233 |
| 10,846,524 | B2* | 11/2020 | Price | G06V 30/416 |
| 2020/0151444 | A1* | 5/2020 | Price | G06V 30/416 |
| 2022/0058450 | A1* | 2/2022 | Lin | G06N 3/08 |

FOREIGN PATENT DOCUMENTS

WO WO-2005068089 A2 * 7/2005 ............. G06F 19/22

OTHER PUBLICATIONS

International Search Report and Written Opinion—PCT/US2021/046977—ISA/EPO—Dec. 7, 2021.
Liu, Z., et al., "Point-Voxel CNN for Efficient 3D Deep Learning", Arxiv.Org, Cornell University Library, 201 Olin Library Cornell University Ithaca, NY 14853, Jul. 8, 2019 (Jul. 8, 2019), XP081548294, pp. 1-11, Sections 1, 3, 4.
Yan, Y., et al., "SECOND: Sparsely Embedded Convolutional Detection", Sensors, vol. 18, No. 10, Oct. 6, 2018 (Oct. 6, 2018), XP055866583, pp. 1-17 (p. 3337), DOI: 10.3390/s18103337 Sections 3 and 4, Figure 2.

* cited by examiner

*Primary Examiner* — Tahmina N Ansari
(74) *Attorney, Agent, or Firm* — Patterson & Sheridan LLP (57) ABSTRACT

Certain aspects of the present disclosure provide techniques for performing tabular convolution, including performing a tabularization operation on input data to generate a tabularized representation of the input data and performing a convolution operation using the tabularized representation of the input data to generate a convolution output.

27 Claims, 8 Drawing Sheets

100A

K = 9

| $k=1$ | $k=2$ | $k=3$ |
|---|---|---|
| $k=4$ | $k=0$ | $k=5$ |
| $k=6$ | $k=7$ | $k=8$ |

|  | $k=1$ |  |
|---|---|---|
| $k=2$ | $k=0$ | $k=3$ |
|  | $k=4$ |  |

SPARSE-AWARE CONVOLUTION AND TECHNIQUES FOR ACCELERATION THEREOF

CROSS-REFERENCE TO RELATED APPLICATIONS

This Application claims the benefit of and priority to U.S. Provisional Patent Application No. 63/068,891, filed on Aug. 21, 2020, the entire contents of which are incorporated herein by reference.

INTRODUCTION

Aspects of the present disclosure relate to improved machine learning processing.

Machine learning is generally the process of producing a trained model (e.g., an artificial neural network, a tree, or other structures), which represents a generalize fit to a set of training data that is known a priori. Applying the trained model to new data produces inferences, which may be used to gain insights into the new data. In some cases, applying the model to the new data is described as "running an inference" on the new data.

As the use of machine learning has proliferated for enabling various machine learning (or artificial intelligence) tasks, the need for more efficient processing of machine learning model data has arisen. For example, "edge processing" devices, such as mobile devices, always on devices, internet of things (IoT) devices, and the like, have to balance processing capabilities with power and packaging constraints.

One aspect of machine learning processing that is conventionally inefficient is processing of sparse data in machine learning models. Machine learning generally requires a large number of mathematical operations on input data, including multiplication and addition operations, among others. Conventionally, these operations are performed whether or not they will result in meaningful output. For example, where input data is very sparse (e.g., has many zero values), conventional machine learning processing nevertheless performs multiplications and additions with the zero value inputs. This can lead to inefficiency as the operations with zero input values may not change or otherwise lead to meaningful output. For example, adding zero to any number results in the same number.

Accordingly, systems and methods are needed for improving the efficiency of machine learning processing of sparse input data.

BRIEF SUMMARY

Certain aspects provide a method for performing tabular convolution, including performing a tabularization operation on input data to generate a tabularized representation of the input data and performing a convolution operation using the tabularized representation of the input data to generate a convolution output.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for efficiently performing machine learning processing of sparse input data, and in particular to performing tabular convolution on sparse data to improve convolution processing efficiency Sparse data generally refers to data, such as vector, matrix, or tensor data, which has a relatively high proportion of zero (or near zero) valued entries. For example, a simple example vector with entries [0, 0, 0, 1] may be considered 75% sparse (and 25% dense). When performing mathematical operations with this example vector, such as an element-wise addition, it is clear that the sparse entries will not change the output values for 75% of the vector elements. Similarly, when performing multiplication operations, it is clear that all successive multiplications operations based on a zero-valued element will likewise take on the zero value. When considering the massive number of mathematical operations in machine learning processing, these sparse entries represent an opportunity for efficiency enhancement, which may beneficially lead to faster machine learning processing, lower power processing, reduced complexity processing, reduced data storage (e.g., memory) needs, lower cost hardware requirements, and other benefits as well.

Sparse representation, in contrast to conventional dense representation, of data is of increasing relevance in many technical domains. For example, modern sensor systems used in various types of end user products may produce generally sparse data. One example is three-dimensional (3D) point clouds generated by light detection and ranging (LiDAR) sensors used in automotive application (e.g., self-driving systems) and in mobile device applications (e.g., for biometric user authentication). Such 3D point clouds are generally very sparse.

Conventional machine learning approaches, such as deep learning, have not exploited sparsity for performance improvements. For example, conventional convolution processing for sparse image data may rely on multilayer perceptron (MLP) operations (e.g., PointNet, PointNet++, and PointConv), which sacrifice efficiency due to the fully-connected nature of their operations.

Other approaches may involve conversion of the sparse input data into other representations, such as by voxelization for 3D convolutional neural network processing, projection/rendering for two-dimensional (2D) convolutional neural network processing, and feature extraction for fully-connected operations. Notably, none of these conversion-based approaches perform deep learning directly in the sparse data representation and thus each of these approaches incurs additional complexity and inefficiency based on the needed conversions.

In some cases, such as when processing the event images from an event camera or sensor, deep-learning approaches are avoided altogether due to the lack of efficient methods for performing convolution on the sparse input data.

Embodiments described herein overcome these conventional technical problems by implementing sparse-aware convolution, which may be alternatively referred to as tabular convolution. Tabular convolution beneficially enables fast and efficient convolution processing directly on sparse data without the need for costly and complex conversions of the input data into a dense representation. Generally, the tabular convolution methods described herein may be applied to 2D convolutions as well as higher-dimensional convolutions. Additional embodiments described herein further enhance tabular convolution by means of various acceleration steps.

Tabular Convolution

Embodiments of tabular convolution described herein may generally include a tabularization operation performed on the input data followed by a specialized convolution that exploits the tabularized input data. The tabularization operation generally takes a sparse data sequence and converts it into a tabular data format with one column of active points and multiple columns indicating the relationship of neighboring points to the active ones. The specialized convolution takes the tabularized input data to perform arithmetic operations equivalent to a conventional convolution, but at significantly reduced complexity. Thus, tabular convolution allows for performing operations directly on sparse data representations (e.g., without an intervening conversion to a dense data representation) while performing the mathematical operations in a dense-fashion (e.g., without processing sparse data elements). As above, sparse data elements in a data representation may generally be zero-valued elements. In some cases, a sparse element threshold value may be used to determine whether an element is to be treated as a sparse element.

By way of example, a sparse input data representation (e.g., an image) may be represented as $X_A^C = \{x_a^c\}$ of shape $\mathbb{R}^{C \times A}$, where C is the number of channels in the input data, and A represents the number of "active" (non-zero) elements in the input data, and thus C×A represents the dimensionality of the real space R.

Thus, $X_A^C$ represents a set of active points (or elements) in a "raw" format that is arbitrary, for example, depending on the sensor and device interface. $X_A^C$ can then be converted into a definite dictionary representation ($X^{active}$) of shape $\mathbb{R}^{C \times (D+1) \times A}$ such that $X^{active} = \{[(d_a^{c,0}, d_a^{c,1}, \ldots, d_a^{c,D-1}), x_a^c]: a=0, 1, \ldots, A-1\}$, where $d_a^{c,j}$ denotes the coordinate in channel c and in dimension j for element a, and $x_a^{active}$ denotes the element value for element a. Because the raw input data has an arbitrary format, there may not always be a D dimension. Here, the "standardization" of the data format may be enforced by introducing a D factor to explicitly represent the D-component coordinate of each active point. Accordingly, $X^{active}$ format is the "dictionary" format of the active elements in which each element is represented by a tuple of the D-component coordinate and the quantity at this coordinate (location).

Assume then a set of depthwise separable weights $\{W_k^c\} \in \mathbb{R}^{C \times K}$ that has K entries (including the center entry $W_0^c$ for channel c) in each channel c, where K is representative of the size of the kernel per channel. In the examples described herein, $K \in \{5, 9\}$ for simplicity, however other embodiments may use different K values.

Now, a tabularization operation may be defined as:

$$T^K(\ ): \mathbb{R}^{C \times (D+1) \times A} \to \mathbb{R}^{C \times A \times K},$$

which converts $X^{active}$ into a tabular (or tabularized) representation $X^T \in \mathbb{R}^{C \times A \times K}$, where $X^T$ in each channel c is denoted as $X_c^T$, $c \in \{0, 1, \ldots, C-1\}$, and where for each c:

$$X^T = T^K(X^{active}) = \{x_{a,k}: a=0,1,\ldots,A-1; k=0,1,\ldots,K-1\},$$

and where:

$$x_{a,k=0} = x_a^{active}, \text{ and}$$

$$x_{a,k>0 \text{ and } k \in \Lambda} = x_a^{active}, \text{ if } |d_a^{c,a} - d_0^{c,d}| \leq 1,$$
$$\forall d \in \{0,1,\ldots,D-1\}.$$

Note that in the expression above, a indicates an active point, and the tabularized value for an active point at the k=0 column is equal to the active point in the (pre-tabularization) $x^{active}$ format.

Given the tabularization operation definition, above, an indexing rule $k = \Lambda$ may be defined, where $\Lambda$ is a set of indices for neighbors to an active point. For example, if K=5, then $\Lambda = \{1,2,3,4\}$ as k=0 is the index for the active point itself.

Figure 1A:
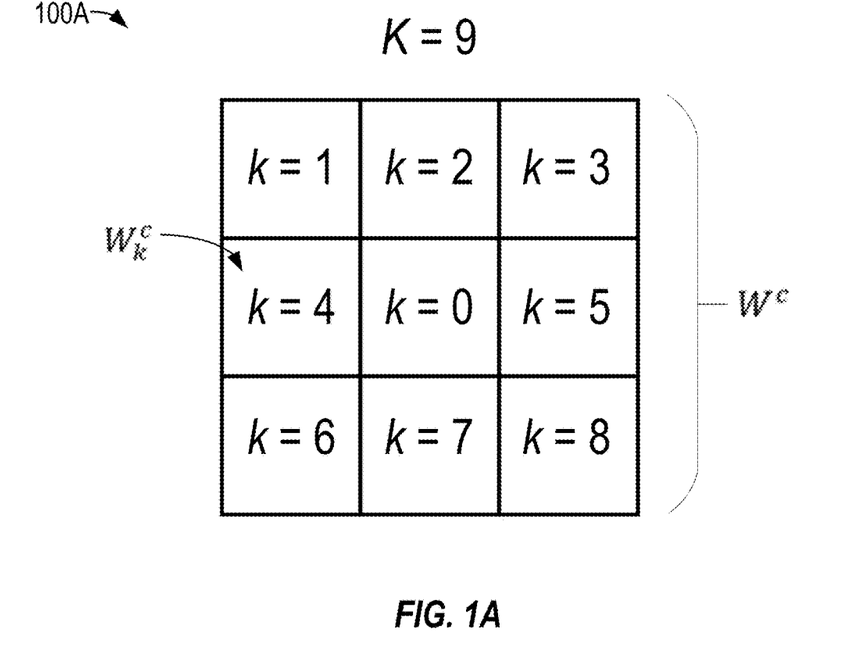
FIGS. 1A and 1B depict examples of weight kernels that may be used in tabular convolution.
Figure 1B:
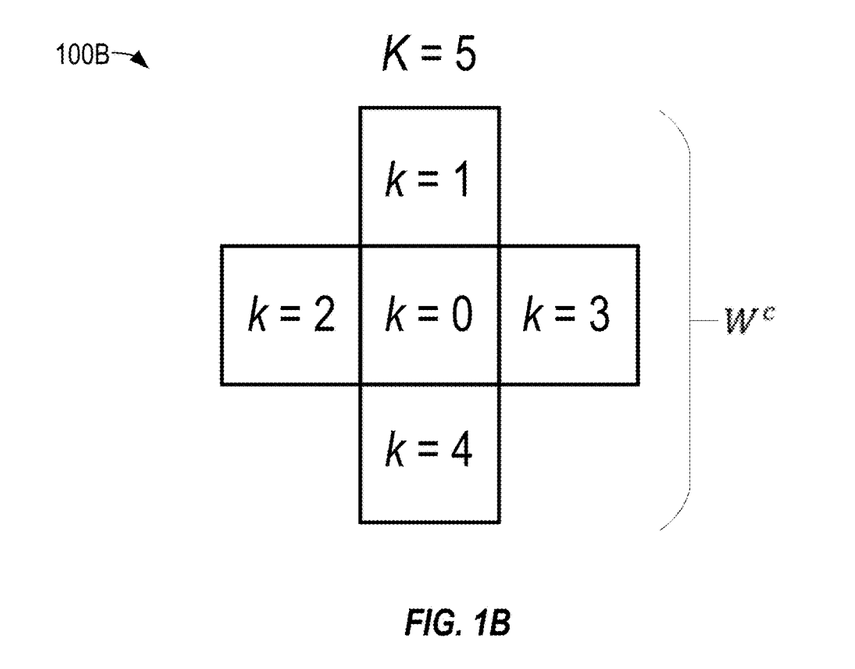

For example, FIGS. 1A and 1B depict two example kernels 100A and 100B comprising weights ($W^c$) for a channel c, where K=9 in for kernel 100A and K=5 for kernel 100B. In this example, kernel 100A of FIG. 1A is a "square kernel" having dimensions 3×3, thus K=9 entries, while kernel 100B of FIG. 1B is a non-square, cruciform kernel having K=5 entries.

In these examples, each entry (e.g., $W_k^c$) of the kernel weight matrices 100A and 100B is sequentially referenced with the middle weight always being k=0.

Thus, consider FIG. 1A where D=2 (dimensions) and K=9 (kernel entries), then an indexing rule may be derived for each $k = \Lambda \in \{1, \ldots, K-1\}$, such that:

$k=1$ if $(d_a^{c,0} - d_0^{c,0}, d_a^{c,1} - d_0^{c,1}) = (-1,-1)$, $k=2$ if $(d_a^{c,0} - d_0^{c,0}, d_a^{c,1} - d_0^{c,1}) = (0,-1)$, $k=3$ if $(d_a^{c,0} - d_0^{c,0}, d_a^{c,1} - d_0^{c,1}) = (1,-1)$, $k=4$ if $(d_a^{c,0} - d_0^{c,0}, d_a^{c,1} - d_0^{c,1}) = (-1,0)$, $k=5$ if $(d_a^{c,0} - d_0^{c,0}, d_a^{c,1} - d_0^{c,1}) = (1,0)$, $k=6$ if $(d_a^{c,0} - d_0^{c,0}, d_a^{c,1} - d_0^{c,1}) = (-1,1)$, $k=7$ if $(d_a^{c,0}-d_0^{c,0}, d_a^{c,1}-d_0^{c,1})=(0,1)$, or $k=8$ if $(d_a^{c,0}-d_0^{c,0}, d_a^{c,1}-d_0^{c,1})=(1,1)$.

As another example, consider FIG. 1B where D=2 (dimensions) and K=5 (kernel entries), then an indexing rule may be derived for each $k=\Lambda \in \{1, \ldots, K-1\}$, such that:

$k=1$ if $(d_a^{c,0}-d_0^{c,0}, d_a^{c,1}-d_0^{c,1})=(0,-1)$, $k=2$ if $(d_a^{c,0}-d_0^{c,0}, d_a^{c,1}-d_0^{c,1})=(-1,0)$, $k=31$ if $(d_a^{c,0}-d_0^{c,0}, d_a^{c,1}-d_0^{c,1})=(1,0)$, or $k=4$ if $(d_a^{c,0}-d_0^{c,0}, d_a^{c,1}-d_0^{c,1})=(0,1)$.

In these examples, where the index values are in a form (x, y), a negative x index value represents a movement to the left relative to the center k=0 index, a negative y index value represents a movement down relative to the center, a positive x index value represents a movement to the right relative to the center, and a positive y index value represents a movement up relative to the center.

Given the sparse input data representation definition and indexing rules described above, FIGS. 2A and 2B depict examples of how a weight kernel is used to form a tabularized output based on a sparse data input.

Figure 2A:
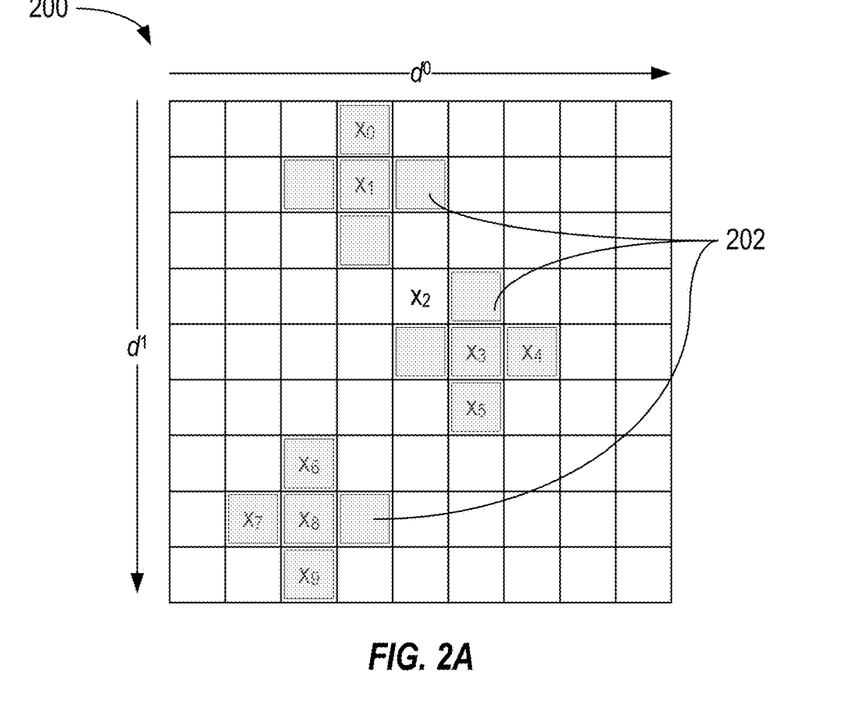
FIGS. 2A and 2B depict example aspects of tabularization of sparse input data.

In particular, FIG. 2A depicts active elements $\{x_0, \ldots, x_9\}$ plotted in D=2 dimensions ($d^0$ and $d^1$). Thus, in this example, A=10 active elements.

Figure 2B:
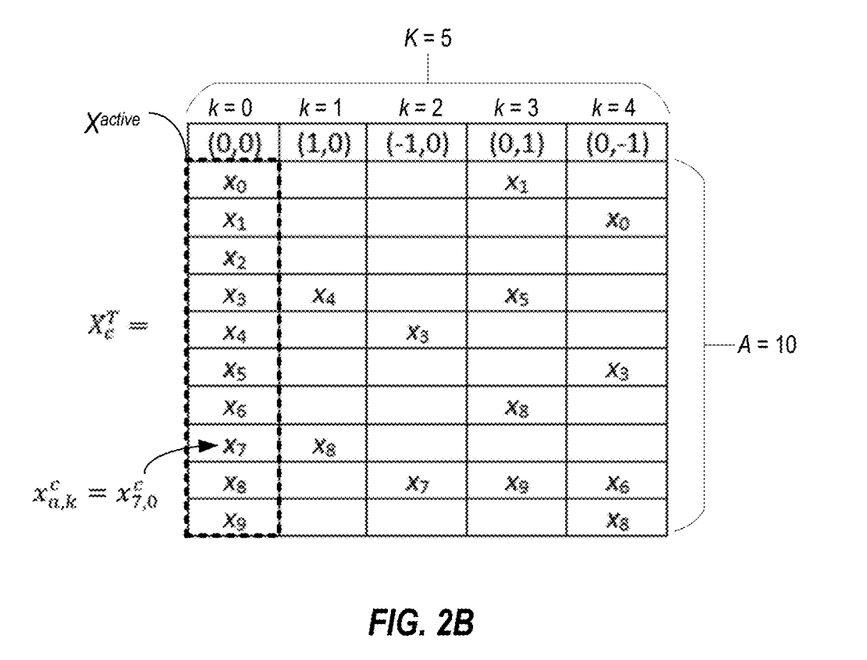

Further in FIG. 2A, weight kernel overlays 202 are depicted to give context to the indexing scheme in FIG. 2B. For example, from the perspective of active element $x_0$, active element $x_1$ is as indexed (0,-1) because it is one unit down (-1) from $x_0$ in the $d^1$ dimension and at the same unit in the $d^0$ dimension.

Based on a weight kernel with K=5 (as in FIG. 1B), the tabularization output $X_c^T = T^K(X^{active})$ for a single channel c of sparse data is depicted in FIG. 2B.

In FIG. 2B, the left-most column in the table, indexed as (0,0) (e.g., a center point) is an active point vector $X^{active}$, which represents the active elements $\{x_0, \ldots, x_9\}$ depicted in FIG. 2A. The remaining columns, indexed as (1,0), (-1,0), (0,1), and (0,-1), represent the tabularized relationships between the active elements based on the indexing rule described above.

Notably, the tabularization operation $T^K$ that generates the output depicted in FIG. 2B involves no multiplication, and only requires bit-wise logic to reorganize the sparse data (which is a significantly smaller amount than the dense data).

Given the previous weight kernel definition $\{W_k^c\} \in \mathbb{R}^{C \times K}$, for each c in C, there is a weight column vector (tensor) $W_k^c \in \mathbb{R}^K$ in a neural network that can be trained and applied in testing to derive tabular convolution output according to the tabularization operation defined by the following:

$Y^c = X_c^T W^c$, where $Y^c \in \mathbb{R}^A$ is a vector for channel c in C. Or, for all channels, the operation may be defined by:

$Y = X^T W \in \mathbb{R}^{C \times A}$

Figure 3:
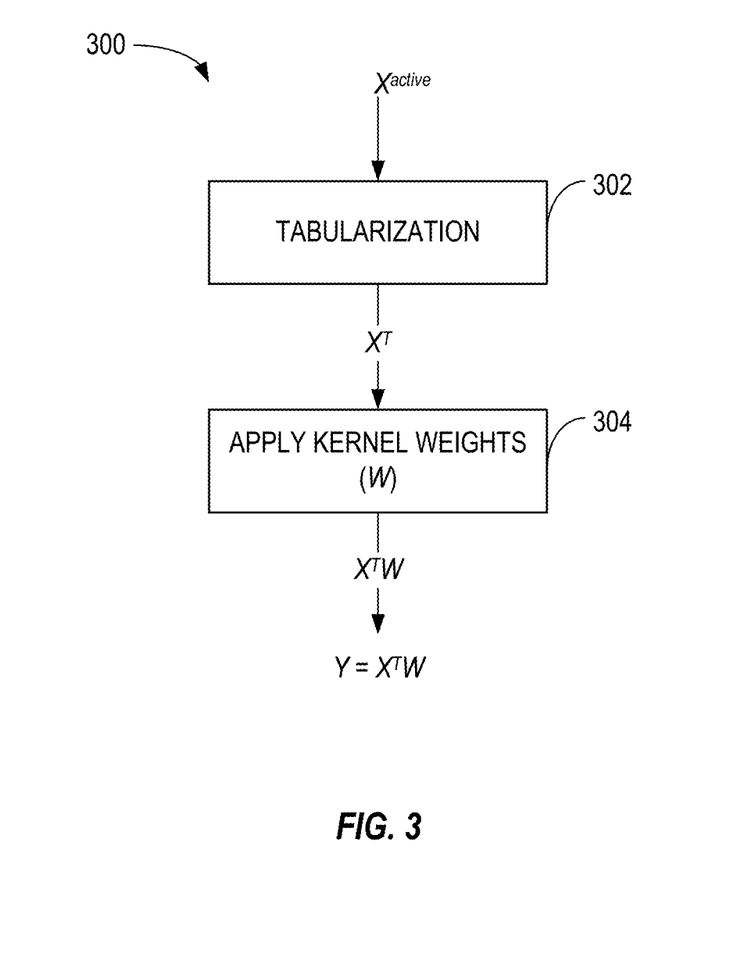
FIG. 3 depicts an example method for performing tabular convolution.

FIG. 3 depicts an example tabularized convolution operation 300, which starts with tabularization of input data $X^{active}$ at step 302 (as described above) to generate tabularized output data $X^T$. Then, the tabularized output data $X^T$ is convolved with kernel weights W at step 304 to generate tabularized convolution output data $Y = X^T W$.

Note that example depicted in FIG. 3 assumes convolution of all one or more channels c in C of data at once, but the process may be iteratively repeated for each channel's data separately, i.e., to generate $X_c^T$ for all channels c in C. In such cases, the partial (channel-specific) convolution output can be accumulated during each channel specific iteration to generate the final tabular convolution output.

Tabular convolution achieves mathematically equivalent convolution results as compared to a conventional dense convolution, but the spare representation enables an efficient matrix multiplication operation. Accordingly, complexity needed for performing tabular convolution is CAK or O(CA) if K is fixed, where C is the number of channels in the input data, A represents the number of active (non-zero) elements in the input data, and K is the number of kernel entries per layer. In the case where N output channels are involved in a convolution layer, the complexity is thus CAKN or O(CAN).

Further, according to the definition above, the sparsity on the sparse representation is maintained after one or more layers of tabular convolution. In other words, the set of active points remains unaffected, which means there is no dilation or blurring of the convolution output, as the destination set of points is strictly followed as the active points.

Figure 4A:
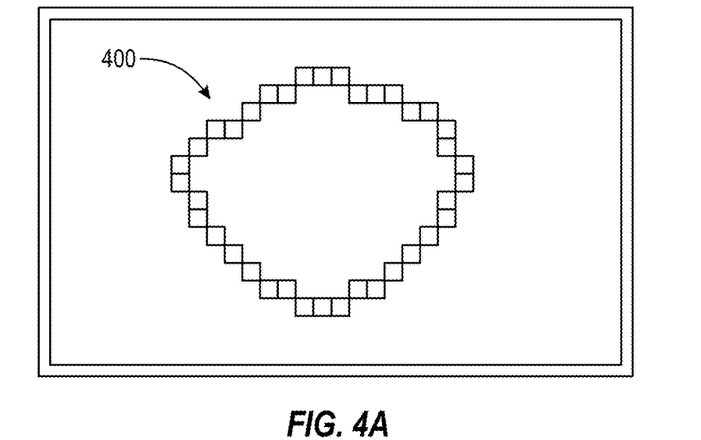
FIGS. 4A-4C depict example results of tabular convolution.
Figure 4B:
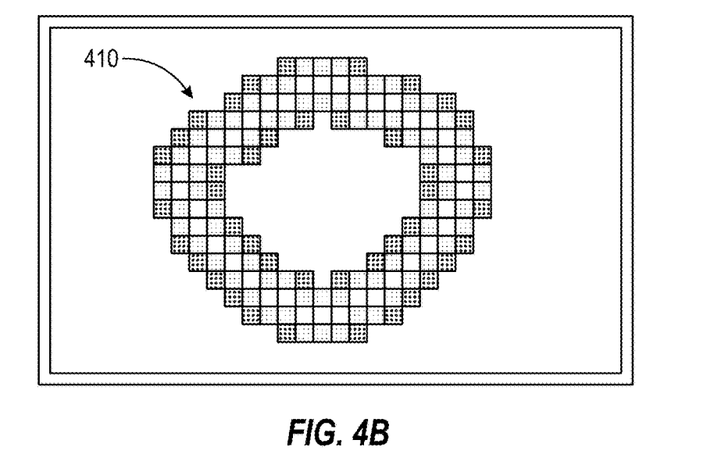
Figure 4C:
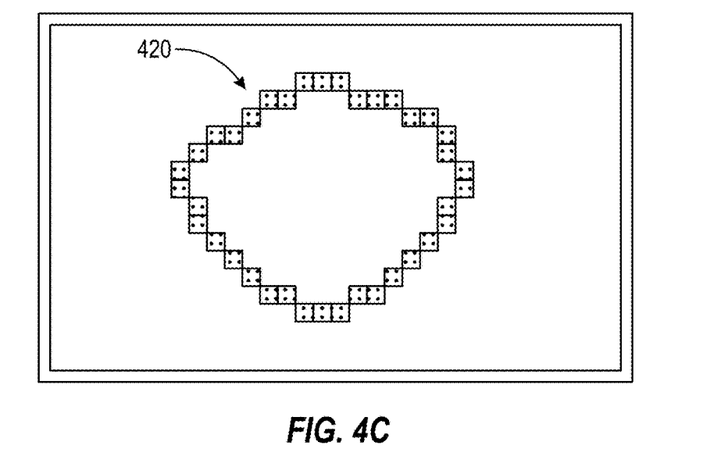

For example, FIGS. 4A-4C depict examples of conventional versus tabularized convolution of sparse input data.

In particular, FIG. 4A depicts sparse input data 400 where the pixels (squares) indicate active elements with non-zero values.

FIG. 4B depicts the result 410 of a conventional convolution of the sparse input data 400. Notably, the convolution has created dilation of the original active elements such that there are many more active elements with non-zero values, as noted by the different shaded pixels around the original input data pixels.

FIG. 4C, on the other hand, depicts the result 420 of a tabular convolution operation. Notably, the values of the active elements has changed, as depicted by the change in patter in each pixel compared to FIG. 4A, but the number and location of pixels having non-zero values (active elements) remains the same.

Tabular Convolution with Skip Connections

Figure 5:
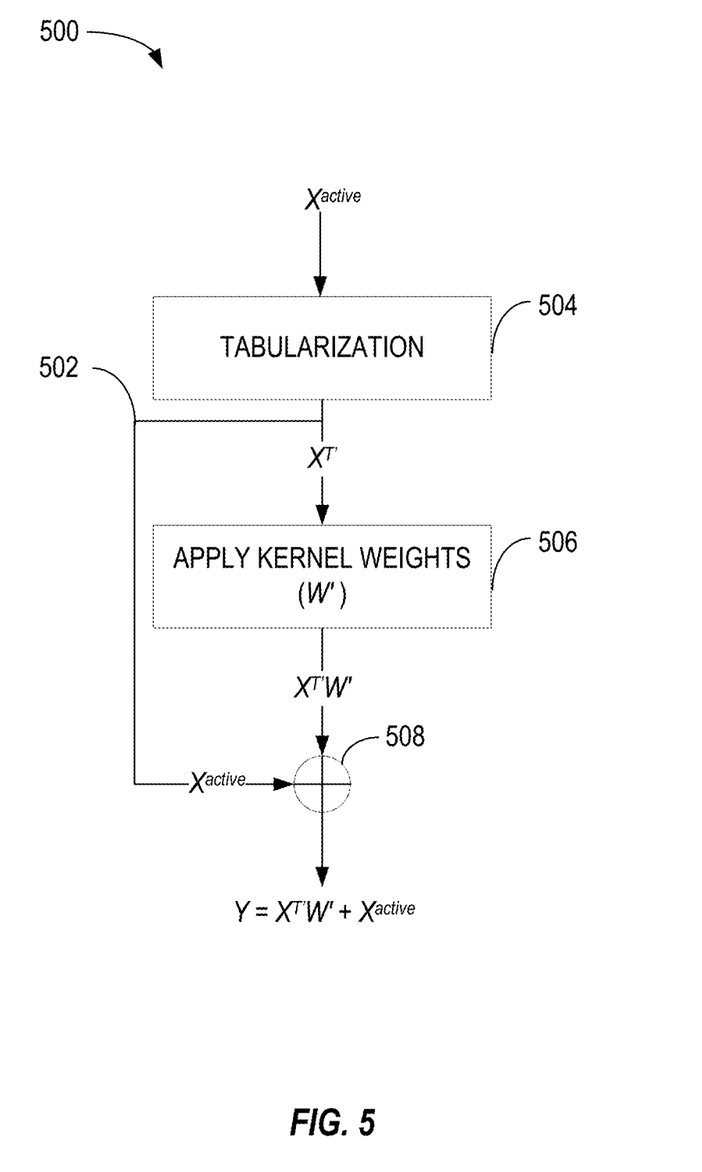
FIG. 5 depicts an example method for performing tabular convolution with skip connections

In some embodiments, tabular convolution may be implemented with skip connections, as depicted in FIG. 5. For such embodiments, $X^T$ may be redefined to $X^{T'}$ as follows:

$X^{T'} = T^K(X^{active}) = \{x_{a,k} : a=0,1, \ldots, A-1; k=1, \ldots, K-1\}$, $x_{a,k=\Lambda} = x_a^{active}$, if $|d_a^{c,d} - d_0^{c,d}| \le 1, \forall d \in \{0,1, \ldots, D-1\}$ Notably, in the redefinition above, k from 1 to K-1 are included, as compared to k from 0 to K-1 in the tabular convolution definition without skip connections, as discussed above. Thus, this redefinition removes column 0 of $X^T$ (the dense vector component with the active elements ($X^{active}$), such as depicted in FIG. 2B) from the tabularization results to form $X^{T'}$ prior to applying kernel weights. Beneficially, removal of the active elements increases the sparsity of the remaining tabularized representation $X^{T'}$, which further improves the efficiency gains of the tabularized convolution.

To account for the removal of the active elements ($X^{active}$) prior to the convolution, a skip connection 502 is added. Further, the weights corresponding to the central entries of kernels (e.g., k=0 in FIGS. 1A and 1B) of all channels become 1's for all active points, and the non-central entries of kernels of all channels remain trainable and are relative to the central entries (of 1's), thereby forming W'. Therefore, the resulting tabular convolution with a skip connection may be represented as:

$$Y = X^{T'}W' + X^{active}$$

Accordingly, in example 500 of FIG. 5, $X^{active}$ is provided as input to tabularization step 504 as well as provided on skip connection 502 to the element-wise summation (or addition) operator 508.

The tabularized data representation $X^{T'}$ (lacking the k=0 active elements) is then convolved with the kernel weights W' in step 506 to generate $X^{T'}W'$. Finally, the convolution output $X^{T'}W'$ is summed with the skip connection 502 (carrying values $X^{active}$) to generate the tabular convolution output Y.

The addition of a skip connection and redefinition of the tabular representation $X^{T'}$ offers additional benefits over tabular convolution without a skip connection (e.g., described with respect to FIG. 3), including further reduction in computation complexity, (especially for non-square weight kernels, such as kernel 100B in FIG. 1B and 202 in FIG. 2A) and further reduction in weight memory and intermediate activation memory (especially for sparse weight kernels). Each of these processing efficiency improvements may save time and power in a processing system, which may be particularly beneficial for mobile an edge processing devices. Further yet, with all-sparse data in intermediate memory, further optimizations are possible, as described below.

Hashed Tabular Convolution

It is possible to further compress the tabular sparse data representation by creating unidimensional hashes for each dimension of the weight kernel.

Figure 6:
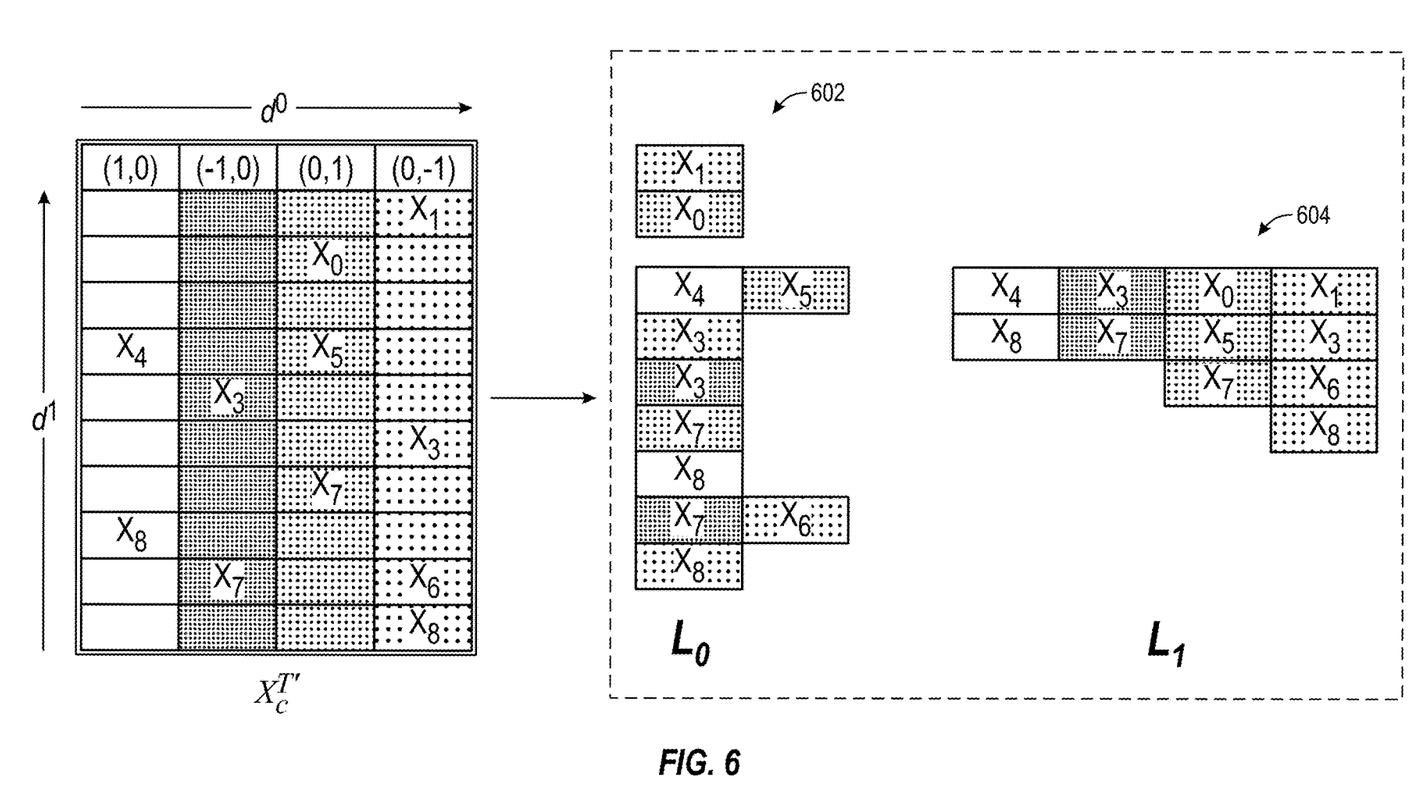
FIG. 6 depicts an example of hashing tabularized input data.

As depicted in FIG. 6, without populating each full column of $X_c^{T'}$ with zero entries, a unidimensional hashed pointer list (e.g., 602 and 604) may be generated for each dimension in the data (e.g., $d^0$ and $d^1$ in this example). Note that here a "hashed pointer list" is used to describe a generalized data structure to represent unidimensional or multi-dimensional structures.

Using the example from FIGS. 1B, 2A and 2B, where K=5 and D=2, hashed pointer lists $\{L_0, L_1\}$ may be defined with each list pointing to values of a dimension $\{X_{c,k}^T: X_{c,k}^T \neq 0\}$ when D=2. In this example, both hashed pointer lists $\{L_0, L_1\}$ here are first built with row-wise pointers for $L_0$ and column-wise pointers for $L_1$. After column-wise collapsing and multiplication by corresponding kernel values to each column, a row-wise collapse is performed in $L_0$ to remove all empty entries. In a general case, a hashed pointer list may be generated for $\{L_0, L_1, \ldots, L_{D-1}\}$, which means that hashed tabular convolution can be applied to higher dimensional data as compared to the 2D data as in the example of FIG. 6.

In order to process the tabular data representation then, $L_1$ is multiplied with the corresponding scaler entry of $W_k^c$ for kernel index k. Thus, for example:

$$L_{1,k} = L_1 W_k^c, k = \Lambda \in \{1, \ldots, K-1\}$$

Since $\{L_0, L_1\}$ are pointer lists, the dereferenced values of the other pointer list $L_0$ automatically become updated with corresponding kernel weights. For example, $L_{0,k} = \{X_{c,k}^T: X_{c,k}^T \neq 0\}$. Finally, all pointed-to entries of the hashed pointer list in $L_0$ are summed to generate the tabular convolution output, for example according to:

$$\text{Sum}(L_{0,k}) = \Sigma_i X_{c,k,i}^T,$$

where i is an index of each element of $L_{0,k}$.

Using hashed pointer lists thus further reduces computational complexity, which in-turn beneficially reduces processing time and reduces memory requirements.

Example Test Results and Efficiency Improvements

In testing, tabular convolution implemented with known convolution architectures, such as ResNet, beneficially reduced both computational complexity and model size by at least 20% with no degradation in accuracy. In testing, all kernel weights were learned through stochastic gradient descent relative to the kernel weight element with k=0 with value 1.

Further, testing showed that non-square kernels (such as kernel 100B in FIG. 1B) resulted in further improvements in complexity and memory utilization as compared to square-kernels with the same extent (e.g., 3 pixels wide and tall, such as kernel 100A in FIG. 1A). Thus, for example, tabular convolution with a non-square kernel (as in FIG. 1B) was able to outperform tabular convolution with a square kernel (as in FIG. 1A) having the same outer extent (e.g., three units wide at the widest and row and three units tall at the tallest column).

Table 1, below, includes further computational complexity comparisons based on the methods described herein:

TABLE 1

Complexity Comparison

| Convolution Type | # of Multiplications/ Model Size | Scenario A: K = 9, A = S/100, R = 4 | Scenario B K = 5, A = S/100, R = 2 |
| --- | --- | --- | --- |
| Conventional Depthwise-Separable Dense Convolution | CSK | 9 * CS | 5 * CS |
| Tabular Convolution | CAK | 0.09 * CS | 0.05 * CS |
| Tabular Convolution w/Skip | CA(K − 1) | 0.08 * CS | 0.04 * CS |
| Hashed Tabular Convolution w/Skip | CAR | 0.04 * CS | 0.02 * CS |

In Table 1, C refers to a number of channels and S=HW, where H and W are height and width, respectively, of the input data (e.g., a tensor). Further, in Table 1, A=S/100 is used as an example in which a density is assumed of 1/10 in each of the 2 dimensions, such as for sparse data from various types of sensors, including an event camera. Further, R is defined as the average (rate) number of neighbors covered by a kernel with respect to the center "active" element. Further, when hashed tabular convolution with a skip connection is used, the kernel size K does not directly impact the number of multiplication; instead, R becomes the determining factor for the number of multiplications (or activation memory size).

As Table 1 indicates, the number of multiplications and model size are beneficially reduced with tabular convolution compared to conventional depthwise separable dense convolution because S=HW>>A, where H is the height of the input data (e.g., in pixels) and W is the width of the input data (e.g., in pixels).

Example Method for Performing Tabular Convolution

Figure 7:
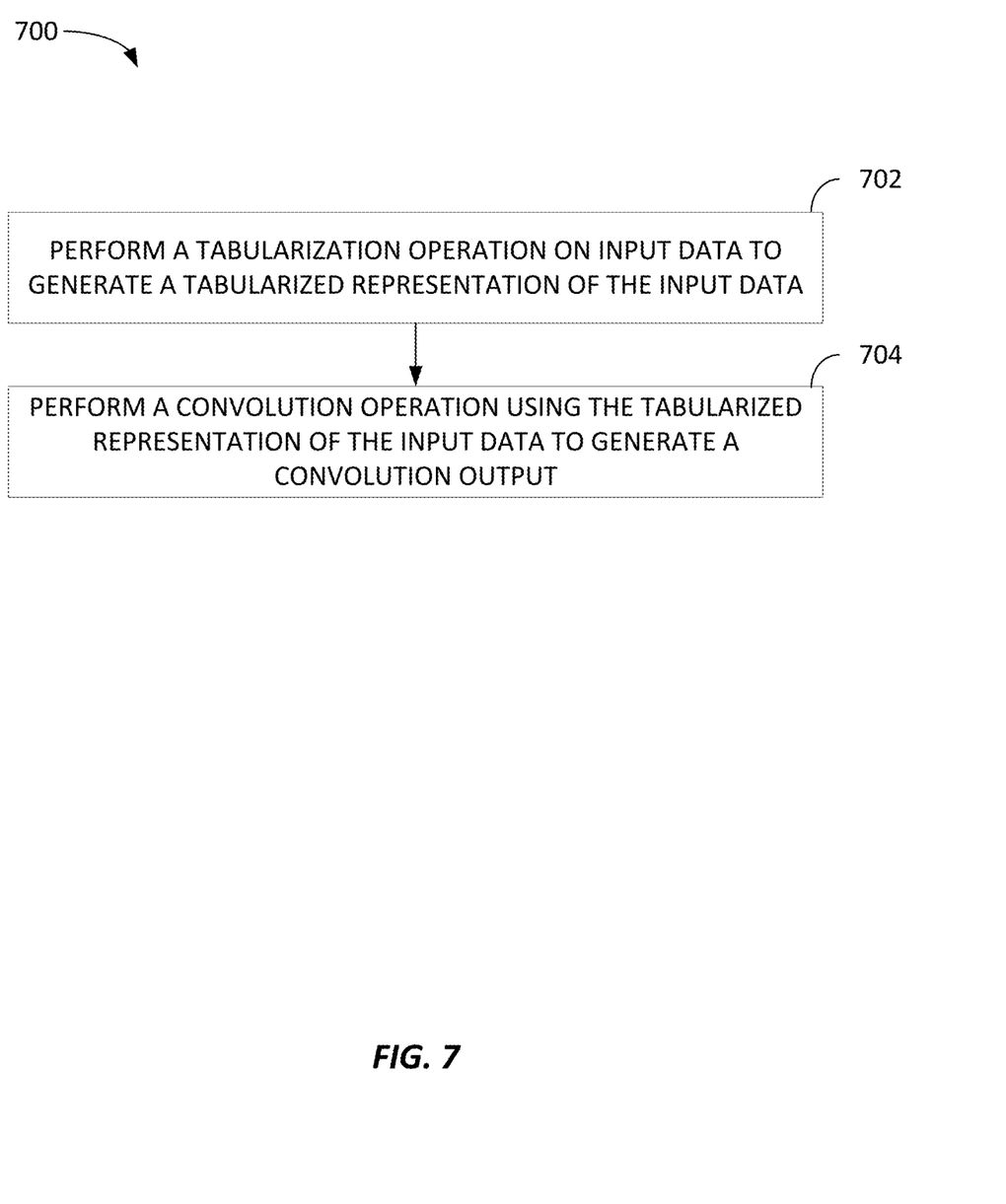
FIG. 7 depicts an example method for performing tabular convolution.

FIG. 7 depicts an example method 700 for performing tabular convolution.

Method 700 begins at step 702 with performing a tabularization operation on input data to generate a tabularized representation of the input data (e.g., as in steps 302 in FIGS. 3 and 504 in FIG. 5).

Method 700 then proceeds to step 704 with performing a convolution operation using the tabularized representation of the input data to generate a convolution output (e.g., as in steps 304 in FIGS. 3 and 506 in FIG. 5).

In some embodiments, method 700 further includes determining input data for a convolution layer of a machine learning model has a sparsity greater than a threshold sparsity value.

In some embodiments of method 700, performing a convolution operation comprises performing a matrix multiplication between a weight tensor and the tabularized representation of the input data to generate a convolution output, such as depicted in FIG. 3 ($X^T W$) and in FIG. 5 ($X^{T'}W'$).

In some embodiments of method 700, performing a tabularization operation comprises using an indexing rule to populate the tabularized representation of the input data, wherein the indexing rule defines a plurality of index values based on a relationship between an active element of the input data and a plurality of elements of the input data adjacent to the active element.

In some embodiments of method 700, a sparsity of the convolution output for the convolution layer is the same as the sparsity of the input data to the convolution layer, such as depicted in the examples of FIGS. 4A and 4C.

In some embodiments, method 700 further incudes removing an active point vector component from the tabularized representation of the input data prior to performing the convolution operation and summing the active point vector component with the convolution output to generate convolution layer output. For example, as described above with respect to FIG. 5, $X^{active}$ may be removed from the tabularized representation to form $X^{T'}$, and $X^{active}$ may be added back in by skip connection 502.

In some embodiments, method 700 further incudes: removing an active point vector component from the tabularized representation of the input data prior to performing the convolution operation; and generating a plurality of unidimensional hashed pointer lists based on the tabularized representation, such as described above with respect to FIG. 6. In such cases, the convolution operation comprises: multiplying an input value associated with each pointer in a first hashed pointer list of the plurality of unidimensional hashed pointer lists by a scaler weight value associated based on a kernel index of the value; and summing a weighted input value associated with each pointer in a second hashed pointer list of the plurality of unidimensional hashed pointer lists to generate the convolution output.

In some embodiments, method 700 further incudes determining a loss value associated with the convolution output, and updating a plurality of weights associated with the convolution layer of the machine learning model based on the loss value.

In some embodiments of method 700, the convolution operation comprises a depthwise separable convolution operation.

In some embodiments of method 700, the input data comprises sparse image sensor data. In some embodiments, the input data comprises a point cloud, such as sparse light detection and ranging (LiDAR) sensor data.

Figure 8:
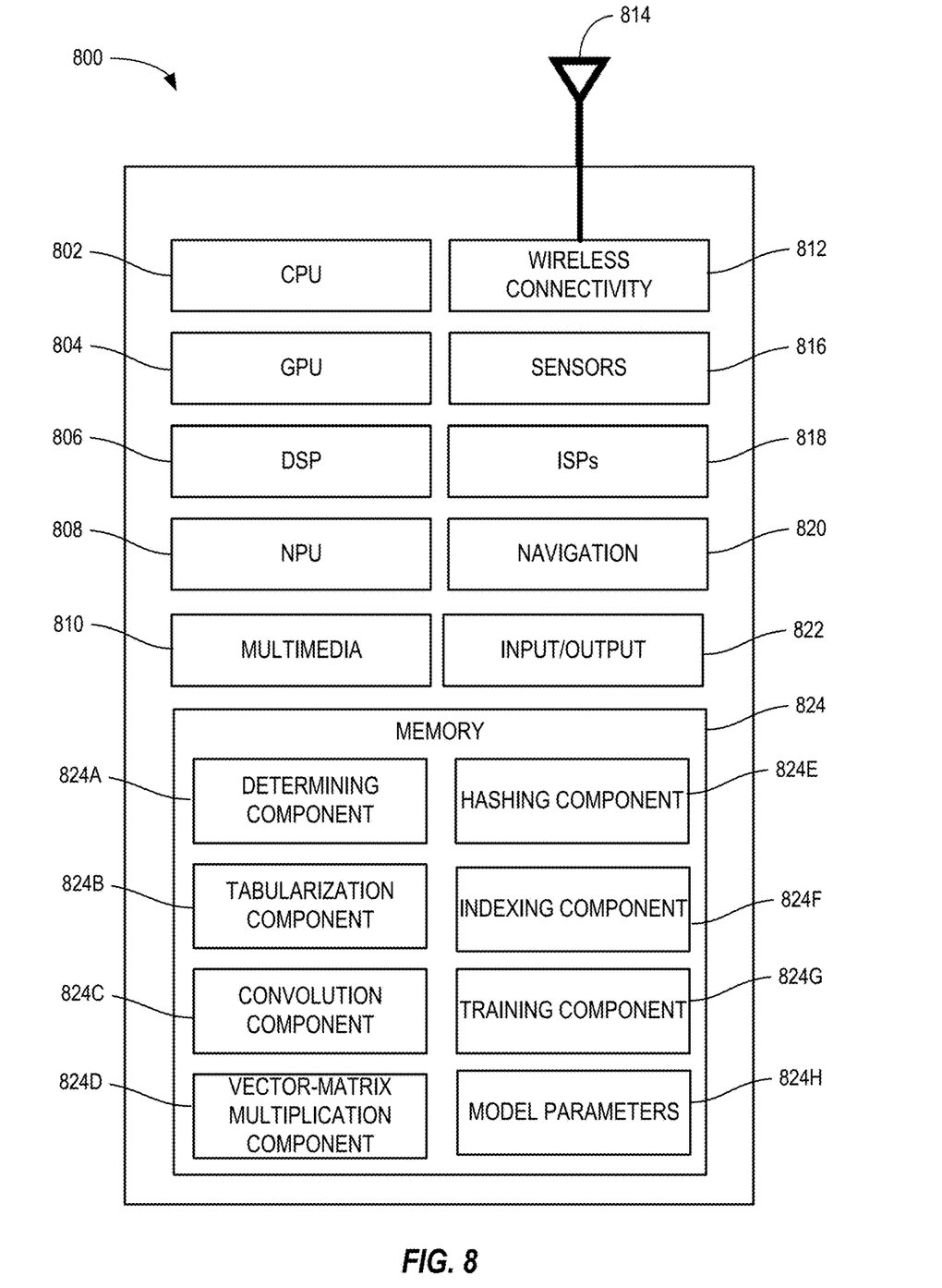
FIG. 8 depicts an example processing system configured for performing tabular convolution.

Example Processing System for Performing Hardware-Based Voice Activity Detection FIG. 8 depicts an example processing system 800 configured for performing tabular convolution, such as described herein for example with respect to FIGS. 2-6.

Processing system 800 includes a central processing unit (CPU) 802, which in some examples may be a multi-core CPU. Instructions executed at the CPU 802 may be loaded, for example, from a program memory associated with the CPU 802 or may be loaded from a memory partition 824.

Processing system 800 also includes additional processing components tailored to specific functions, such as a graphics processing unit (GPU) 804, a digital signal processor (DSP) 806, a neural processing unit (NPU) 808, a multimedia processing unit 810, a multimedia processing unit 810, and a wireless connectivity component 812.

An NPU, such as 808, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 808, may be configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the training of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 812 is further connected to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes determining component 824A, tabularization component 824B, convolution component 824C, vector-matrix multiplication component 824D, hashing component 824E, indexing component 824F, training component 824G, and model parameters 824G. The depicted components, and others not depicted, may be configured to perform various aspects of the methods described herein.

Generally, processing system 800 and/or components thereof may be configured to perform the methods described herein. Notably, where a processing system is configured primarily for training a machine learning model using tabular convolution, it may omit certain aspects, such as multimedia 810, wireless connectivity 812, antennas 814, sensors 816, ISPs 818, and navigation 820.

Example Clauses

Implementation examples are described in the following numbered clauses:

Clause 1: A method, comprising: performing a tabularization operation on input data to generate a tabularized representation of the input data; and performing a convolution operation using the tabularized representation of the input data to generate a convolution output.

Clause 2: The method of Clause 1, further comprising performing the tabularization operation based on determining that the input data has a sparsity greater than a threshold sparsity value.

Clause 3: The method of any one of Clauses 1-2, wherein performing a convolution operation comprises performing a matrix multiplication between a weight tensor and the tabularized representation of the input data to generate the convolution output.

Clause 4: The method of any one of Clauses 1-3, wherein performing a tabularization operation comprises: populating the tabularized representation of the input data according to an indexing rule, wherein the indexing rule defines a plurality of index values based on a relationship between an active element of the input data and a plurality of elements of the input data adjacent to the active element.

Clause 5: The method of any one of Clauses 1-4, wherein a sparsity of the convolution output is the same as the sparsity of the input data.

Clause 6: The method of any one of Clauses 1-5, further comprising: removing an active point vector component from the tabularized representation of the input data prior to performing the convolution operation; and summing the active point vector component with the convolution output to generate convolution layer output.

Clause 7: The method of Clause 4, further comprising: removing an active point vector component from the tabularized representation of the input data prior to performing the convolution operation; and generating a plurality of unidimensional hashed pointer lists based on the tabularized representation, wherein the convolution operation comprises: multiplying an input value associated with each pointer in a first hashed pointer list of the plurality of unidimensional hashed pointer lists by a scaler weight value based on a kernel index of the input value; and summing a weighted input value associated with each pointer in a second hashed pointer list of the plurality of unidimensional hashed pointer lists to generate the convolution output.

Clause 8: The method of any one of Clauses 1-7, further comprising: determining a loss value associated with the convolution output; and updating a plurality of weights associated with a convolution layer of a machine learning model based on the loss value.

Clause 9: The method of any one of Clauses 1-8, wherein the convolution operation comprises a depthwise separable convolution operation.

Clause 10: The method of any one of Clauses 1-9, wherein the input data comprises sparse image sensor data.

Clause 11: The method of any one of Clauses 1-10, wherein the input data comprises sparse light detection and ranging (LiDAR) sensor data.

Clause 12: A processing system, comprising: a memory comprising computer-executable instructions; and one or more processors configured to execute the computer-executable instructions and cause the processing system to perform a method in accordance with any one of Clauses 1-11.

Clause 13: A processing system, comprising means for performing a method in accordance with any one of Clauses 1-11.

Clause 14: A non-transitory computer-readable medium comprising computer-executable instructions that, when executed by one or more processors of a processing system, cause the processing system to perform a method in accordance with any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    performing a tabularization operation on input data to generate a tabularized representation of the input data, wherein performing the tabularization operation comprises populating the tabularized representation of the input data according to an indexing rule, wherein the indexing rule defines a plurality of index values based on a relationship between an active element of the input data and a plurality of elements of the input data adjacent to the active element;
    performing, using a convolutional layer of a neural network, a convolution operation using the tabularized representation of the input data to generate a convolution output; and
    generating, using the neural network, an inference, based on the convolution output.

2. The method of claim 1, further comprising performing the tabularization operation based on determining that the input data has a sparsity greater than a threshold sparsity value.

3. The method of claim 1, wherein performing a convolution operation comprises performing a matrix multiplication between a weight tensor and the tabularized representation of the input data to generate the convolution output.

4. The method of claim 1, wherein a sparsity of the convolution output is the same as the sparsity of the input data.

5. The method of claim 1, further comprising:
    removing an active point vector component from the tabularized representation of the input data prior to performing the convolution operation; and
    summing the active point vector component with the convolution output to generate convolution layer output.

6. The method of claim 1, further comprising:
    removing an active point vector component from the tabularized representation of the input data prior to performing the convolution operation; and
    generating a plurality of unidimensional hashed pointer lists based on the tabularized representation,
    wherein the convolution operation comprises:
        multiplying an input value associated with each pointer in a first hashed pointer list of the plurality of unidimensional hashed pointer lists by a scaler weight value based on a kernel index of the input value; and
        summing a weighted input value associated with each pointer in a second hashed pointer list of the plurality of unidimensional hashed pointer lists to generate the convolution output.

7. The method of claim 1, further comprising:
    determining a loss value associated with the convolution output; and
    updating a plurality of weights associated with a convolution layer of a machine learning model based on the loss value.

8. The method of claim 1, wherein the convolution operation comprises a depthwise separable convolution operation.

9. The method of claim 1, wherein the input data comprises sparse image sensor data.

10. The method of claim 1, wherein the input data comprises sparse light detection and ranging (LiDAR) sensor data.

11. A processing system, comprising:
    a memory comprising computer-executable instructions; and
    one or more processors configured to execute the computer-executable instructions and cause the processing system to:
        perform a tabularization operation on input data to generate a tabularized representation of the input data, wherein performance of the tabularization operation comprises population of the tabularized representation of the input data according to an indexing rule, wherein the indexing rule defines a plurality of index values based on a relationship between an active element of the input data and a plurality of elements of the input data adjacent to the active element;

perform, using a convolutional layer of a neural network, a convolution operation using the tabularized representation of the input data to generate a convolution output; and generate, using the neural network, an inference, based on the convolution output.

12. The processing system of claim 11, wherein the one or more processors are further configured to perform the tabularization operation based on a determination that the input data has a sparsity greater than a threshold sparsity value.

13. The processing system of claim 11, wherein in order to perform a convolution operation, the one or more processors are further configured to perform a matrix multiplication between a weight tensor and the tabularized representation of the input data to generate the convolution output.

14. The processing system of claim 11, wherein a sparsity of the convolution output is the same as the sparsity of the input data.

15. The processing system of claim 11, wherein the one or more processors are further configured to:
  remove an active point vector component from the tabularized representation of the input data prior to performing the convolution operation; and
  sum the active point vector component with the convolution output to generate convolution layer output.

16. The processing system of claim 11, wherein the one or more processors are further configured to:
  remove an active point vector component from the tabularized representation of the input data prior to performing the convolution operation; and
  generate a plurality of unidimensional hashed pointer lists based on the tabularized representation,
  wherein in order to perform the convolution operation, the one or more processors are further configured to:
    multiply an input value associated with each pointer in a first hashed pointer list of the plurality of unidimensional hashed pointer lists by a scaler weight value based on a kernel index of the input value; and
    sum a weighted input value associated with each pointer in a second hashed pointer list of the plurality of unidimensional hashed pointer lists to generate the convolution output.

17. The processing system of claim 11, wherein the one or more processors are further configured to:
  determine a loss value associated with the convolution output; and
  update a plurality of weights associated with a convolution layer of a machine learning model based on the loss value.

18. The processing system of claim 11, wherein the convolution operation comprises a depthwise separable convolution operation.

19. The processing system of claim 11, wherein the input data comprises sparse image sensor data.

20. The processing system of claim 11, wherein the input data comprises sparse light detection and ranging (LiDAR) sensor data.

21. A non-transitory computer-readable medium comprising computer-executable instructions that, when executed by one or more processors of a processing system, cause the processing system to perform a method, the method comprising:

performing a tabularization operation on input data to generate a tabularized representation of the input data, wherein performing the tabularization operation comprises populating the tabularized representation of the input data according to an indexing rule, wherein the indexing rule defines a plurality of index values based on a relationship between an active element of the input data and a plurality of elements of the input data adjacent to the active element;

performing, using a convolutional layer of a neural network, a convolution operation using the tabularized representation of the input data to generate a convolution output; and generating, using the neural network, an inference, based on the convolution output.

22. The non-transitory computer-readable medium of claim 21, wherein the method further comprises performing the tabularization operation based on determining that the input data has a sparsity greater than a threshold sparsity value.

23. The non-transitory computer-readable medium of claim 21, wherein performing a convolution operation comprises performing a matrix multiplication between a weight tensor and the tabularized representation of the input data to generate the convolution output.

24. The non-transitory computer-readable medium of claim 21, wherein a sparsity of the convolution output is the same as the sparsity of the input data.

25. The non-transitory computer-readable medium of claim 21, wherein the method further comprises:
  removing an active point vector component from the tabularized representation of the input data prior to performing the convolution operation; and
  summing the active point vector component with the convolution output to generate convolution layer output.

26. The non-transitory computer-readable medium of claim 21, wherein the method further comprises:
  removing an active point vector component from the tabularized representation of the input data prior to performing the convolution operation; and
  generating a plurality of unidimensional hashed pointer lists based on the tabularized representation,
  wherein the convolution operation comprises:
    multiplying an input value associated with each pointer in a first hashed pointer list of the plurality of unidimensional hashed pointer lists by a scaler weight value based on a kernel index of the input value; and
    summing a weighted input value associated with each pointer in a second hashed pointer list of the plurality of unidimensional hashed pointer lists to generate the convolution output.

27. The non-transitory computer-readable medium of claim 21, wherein the method further comprises:
  determining a loss value associated with the convolution output; and
  updating a plurality of weights associated with a convolution layer of a machine learning model based on the loss value.

* * * * *